United States Patent [19]
Kushizaki et al.

[11] Patent Number: 5,203,814
[45] Date of Patent: Apr. 20, 1993

[54] METHOD OF MANUFACTURING AN AUTOMOBILE ROOF UNIT

[75] Inventors: Ken Kushizaki; Keizaburo Otaki; Chitoshi Kato, all of Sayama, Japan

[73] Assignee: Honda Giken Kogyo Kabushiki Kaisha, Tokyo, Japan

[21] Appl. No.: 652,645

[22] Filed: Feb. 8, 1991

[30] Foreign Application Priority Data

Feb. 13, 1990 [JP] Japan ................................. 2-033024
Feb. 16, 1990 [JP] Japan ................................. 2-035584
Apr. 24, 1990 [JP] Japan ................................. 2-107781

[51] Int. Cl.$^5$ .............................................. B23P 21/00
[52] U.S. Cl. ..................................... 29/897.2; 29/429; 29/430; 29/458; 29/467
[58] Field of Search .................... 29/897.2, 428, 429, 29/430, 467, 458, 771, 784, 786, 787

[56] References Cited

U.S. PATENT DOCUMENTS

| | | | |
|---|---|---|---|
| 1,877,653 | 9/1932 | Fageal | 29/897.2 |
| 4,020,603 | 5/1977 | Austill | 29/897.2 |
| 4,462,746 | 7/1984 | Smets . | |
| 4,710,089 | 12/1987 | Schneider . | |
| 4,759,489 | 7/1988 | Pigott | 29/430 |
| 4,776,084 | 10/1988 | Naruse et al. | 29/771 |
| 4,893,398 | 1/1990 | Zimmer | 29/568 |

FOREIGN PATENT DOCUMENTS

| | | |
|---|---|---|
| 2079226 | 1/1982 | United Kingdom . |
| 2133749 | 8/1984 | United Kingdom . |
| 2134033 | 8/1984 | United Kingdom . |
| 2185220 | 7/1987 | United Kingdom . |

Primary Examiner—P. W. Echols
Assistant Examiner—David P. Bryant

[57] ABSTRACT

A roof unit for an automobile is composed of a roof panel and stiffeners welded thereto. One roof panel is unloaded from a stack of roof panels stored in a carriage, and fed to a working station. The stiffeners which are coated with a sealer are also fed to the working station. The roof panel and the stiffeners are then welded into a roof unit in the working station. An apparatus for manufacturing a roof unit includes a first feed mechanism for unloading a roof panel from a stack of roof panels and feeding the unloaded roof panel to the working station, a second feed mechanism for feeding sealed stiffeners to the working station, a third feed mechanism for feeding a jig to the working station to assemble the roof panel and the stiffener into a roof unit in the working station, and a fourth feed mechanism for feeding the roof unit from the working station. The first through fourth feed mechanisms are disposed around the working station and oriented in respective different four directions therearound.

2 Claims, 11 Drawing Sheets

METHOD OF MANUFACTURING AN AUTOMOBILE ROOF UNIT

BACKGROUND OF THE INVENTION

1. Field of the Invention

The present invention relates to a method of and an apparatus for automatically manufacturing a roof unit for an automobile.

2. Prior Art

Roof units of automotive bodies comprise a roof panel, stiffeners, and other components. In various processes such as sealing, hemming, and welding processes to manufacture roof units, these components are delivered into working stations, positioned in the working stations, and delivered out of the working stations by the operators.

Since, however, there are a considerably large number of components per roof unit, it is not economical to allocate the operators to the respective components. In the sealing process, the roof panel is inverted or turned upside down, resulting in a complex manufacturing procedure.

In each of the processes, a dedicated jig is employed for fixing each component. If a wide variety of roof units are manufactured each in a small quantity, the number of such dedicated jigs used is so large that the cost of manufacture of roof units is high, the time required to replace the jigs is long, and a large space is needed to store the jigs.

Handling of workpieces such as roof panels, e.g., storage of such workpieces, poses a problem because they are relatively large in size and number. It has been attempted to place stacks of workpieces on a carriage. However, it is difficult to stack workpieces while they are being accurately positioned. The shapes of certain workpieces involved make it practically impossible to position the workpieces with accuracy. It is customary for the operator to take out the workpieces manually from the carriage. Such a manual unloading process presents an obstacle to automatization and efficient operation of the entire manufacturing system.

Positioning relatively large workpieces such as stiffeners requires jigs which are larger than the workpieces to be positioned. Replacement of the jigs is therefore cumbersome each time the shape of the workpieces is changed. The more shapes of workpieces, the greater the number of jigs needed, resulting in a greater storage space for the large jigs. In addition, the equipment used to replace the jigs is also large in size.

SUMMARY OF THE INVENTION

It is an object of the present invention to provide a method of efficiently manufacturing a roof unit in relatively short processes or steps.

Another object of the present invention is to provide an apparatus for carrying out such a method of manufacturing a roof unit.

According to the present invention, there is provided a method of manufacturing a roof unit for an automobile, comprising the steps of unloading a roof panel from a stack of roof panels, feeding the unloaded roof panel to a working station, sealing at least one stiffener, feeding the sealed stiffener to the working station, and assembling the roof panel and the stiffener into a roof unit in the working station.

According to the present invention, there is further provided a method of manufacturing a roof unit for an automobile, comprising the steps of unloading a stack of roof unit workpieces from an unloading station, feeding the stack of roof unit workpieces to a standby station, holding and elevating an uppermost one of the roof unit workpieces in the standby station, positioning the elevated roof unit workpiece in a desired posture above the standby station, and feeding the positioned roof unit workpiece to a next station.

According to the present invention, there is further provided an apparatus for manufacturing a roof unit for an automobile, comprising a first feed mechanism for unloading a roof panel from a stack of roof panels and feeding the unloaded roof panel to a working station, a second feed mechanism for feeding at least one sealed stiffener to the working station, a third feed mechanism for feeding a jig to the working station to assemble the roof panel and the stiffener into a roof unit in the working station, and a fourth feed mechanism for feeding the roof unit from the working station, the first through fourth feed mechanisms being disposed around the working station and oriented in respective different four directions therearound. The first feed mechanism comprises a rail, a mobile body movable on and along the rail, a slide base movably mounted on the mobile body through a rack and pinion, and a suction cup supported on the slide base for attracting the roof panel. The second feed mechanism comprises a rail, a movable base movable on and along the rail, a vertically movable base supported on the movable base, and a jig disposed on the vertically movable base, for holding the stiffener. The third feed mechanism comprises a rail, a mobile base movable on and along the rail, a jig vertically movably supported on the mobile base and having clamping means for positioning and holding the roof unit and the stiffener, and hemming means movably supported on the mobile base, for hemming the roof unit and the stiffener. The fourth feed mechanism comprises an actuator, a movable base movable by the actuator, and a suction cup mounted on the movable base, for attracting and holding the roof unit.

According to the present invention, there is also provided an apparatus for manufacturing a roof unit for an automobile, comprising an unloading station, a standby station, an unloading mechanism for unloading a stack of roof unit workpieces from the unloading station, the unloading mechanism being reciprocally movable between the unloading station and the standby station, a positioning mechanism for positioning an uppermost one of the roof unit workpieces in a predetermined posture in the standby station, and a feed mechanism for holding the uppermost one of the roof unit workpieces, the feed mechanism being reciprocally movable between the standby station and a next station. The positioning mechanism comprises a slide base movable in a direction transverse to a feed direction in which the unloading mechanism is movable, an aligning jig movably disposed on the slide base for aligning the roof unit workpiece, the aligning jig being movable in the feed direction, and a plurality of positioning pins disposed on the slide base, for engaging the aligning jig to position the roof unit workpiece, the positioning pins being of different lengths. The feed mechanism comprises a rail, a mobile body movable on and along the rail, a slide base movably mounted on the mobile body through a rack and pinion, and a suction cup supported on the slide base for attracting the roof unit workpiece.

According to the present invention, there is also provided an apparatus for manufacturing a roof unit for an automobile, comprising at least one pair of elongate jigs for positioning and holding at least one roof unit workpiece. The elongate jigs include a pair of first elongate jigs spaced from each other by a first distance for positioning and holding the roof unit workpiece, and a pair of second elongate jigs spaced from each other by a second distance different from the first distance, for holding the roof unit workpiece as it is positioned by the first elongate jigs, the second elongate jigs being movable while holding the roof unit workpiece. The apparatus further includes a stocker disposed near the elongate jigs, for storing a plurality of pairs of elongate jigs, the stocker being vertically movable to replace the pair of elongate jigs with one of the stored pairs of elongate jigs.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
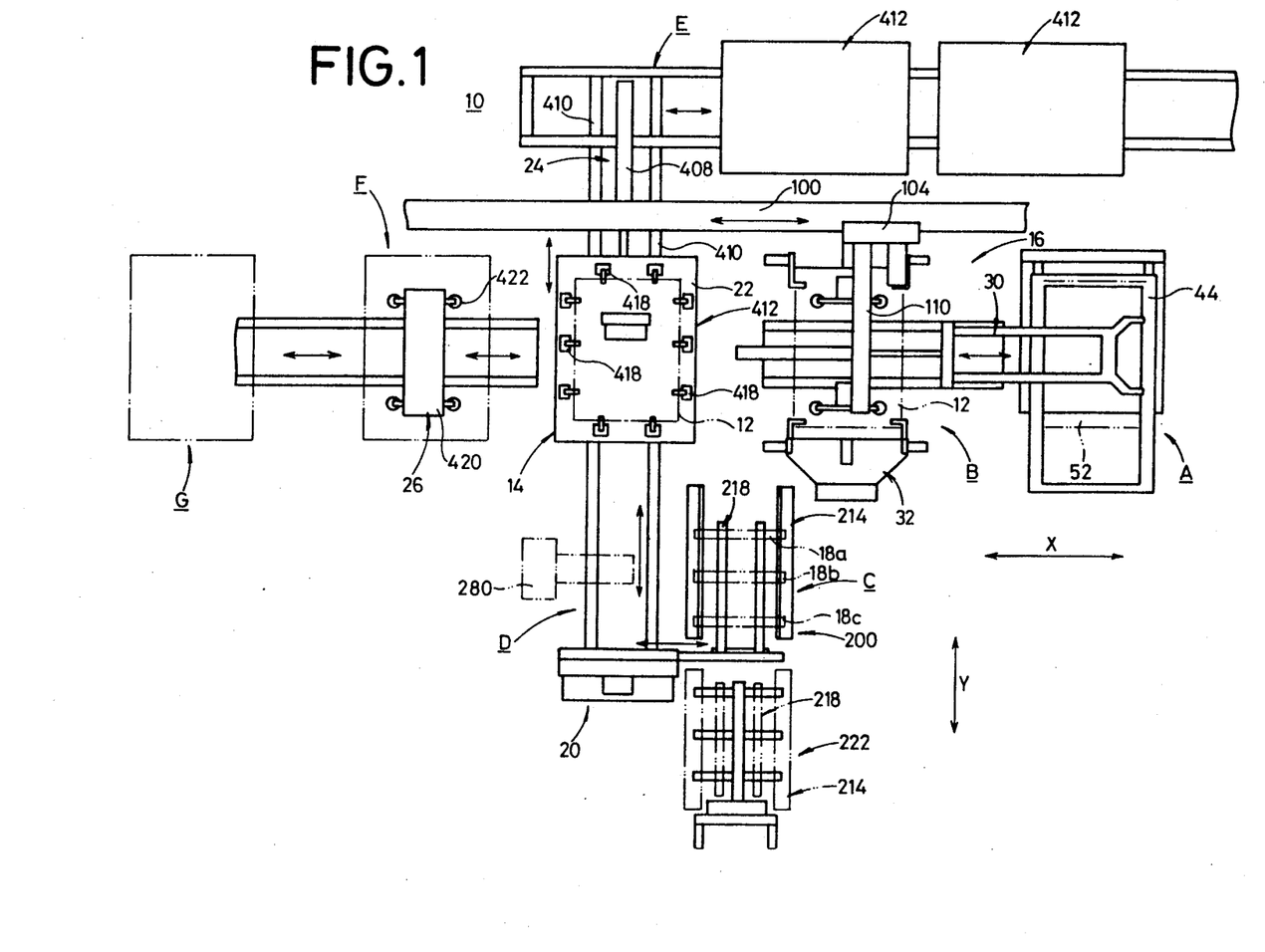
FIG. 1 is a schematic plan view of an apparatus for carrying out a method of manufacturing a roof unit according to the present invention.

FIG. 1 shows an apparatus, generally denoted at 10, for manufacturing a roof unit for an automobile, according to the present invention. The apparatus 10 comprises a first feed mechanism 16 for taking out one roof panel 12 at a time from a stack of roof panes and feeding the roof panel 12 to a working station 14, a second feed mechanism 20 for feeding stiffeners 18a through 18c which have been sealed to the working station 14, a third feed mechanism 24 for feeding a vertically movable positioning jig 22 to the working station 14 to replace another jig for assembling the roof panel 12 and the stiffeners 18a through 18c, and a fourth feeding mechanism 26 for discharging an assembled roof unit from the working station 14. The first feed mechanism 16, the second feed mechanism 20, the third feed mechanism 24, and the fourth feed mechanism 26 are disposed around the working station 14 and oriented respectively in four different directions therearound.

A stack of roof panels 12 is disposed in an unloading station A. An unloading mechanism 30 is reciprocally movable between the unloading station A and a standby station B. An uppermost roof panel 12 is positioned in a desired posture in the standby station B by a positioning mechanism 32. The uppermost roof panel 12 is held and delivered to the working station 14 by the first feed mechanism 16. The unloading mechanism 30, the positioning mechanism 32, and the first feed mechanism 16 are disposed adjacent to each other.

Figure 2:
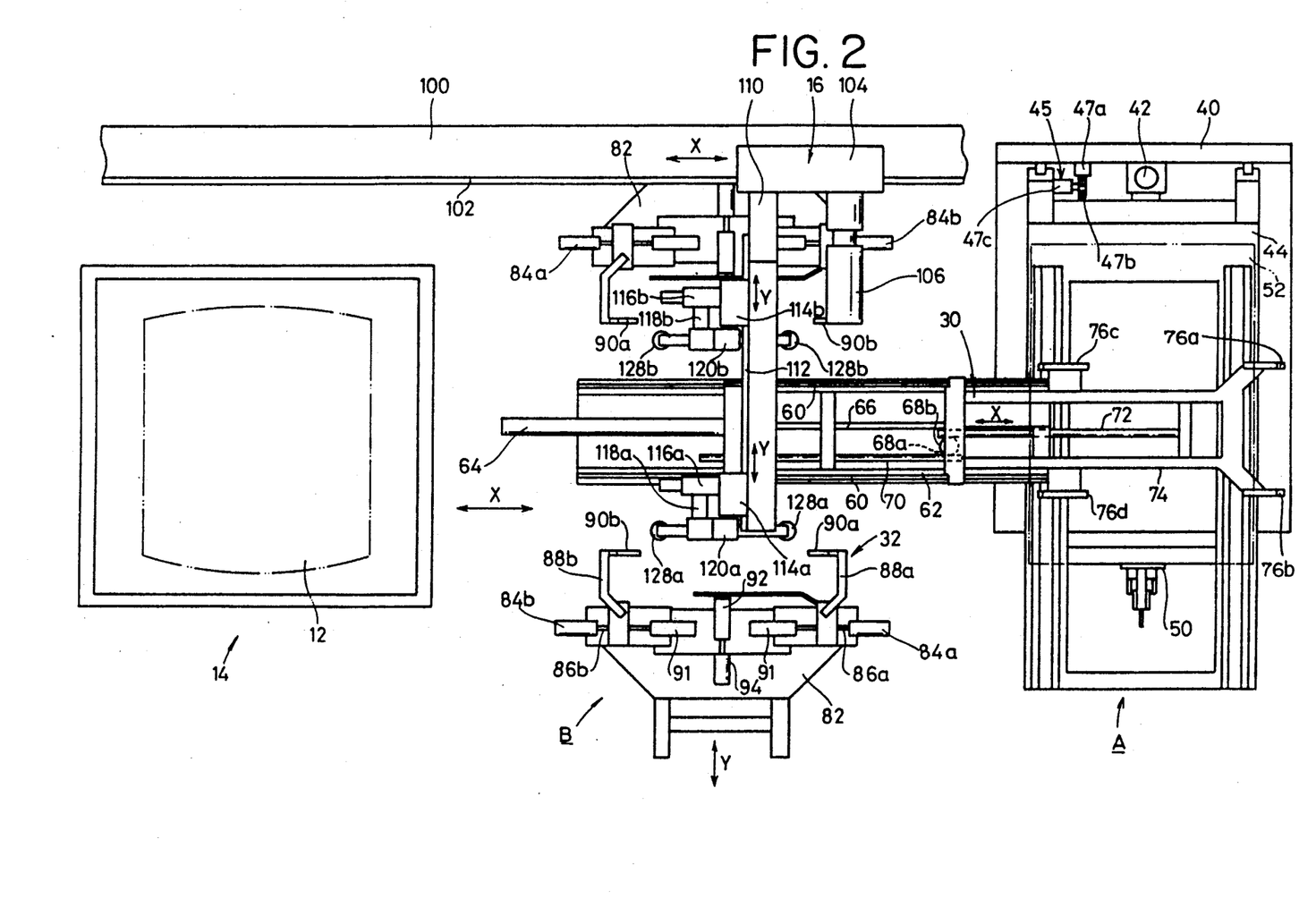
FIG. 2 is a plan view of a first feed mechanism of the apparatus.
Figure 3:
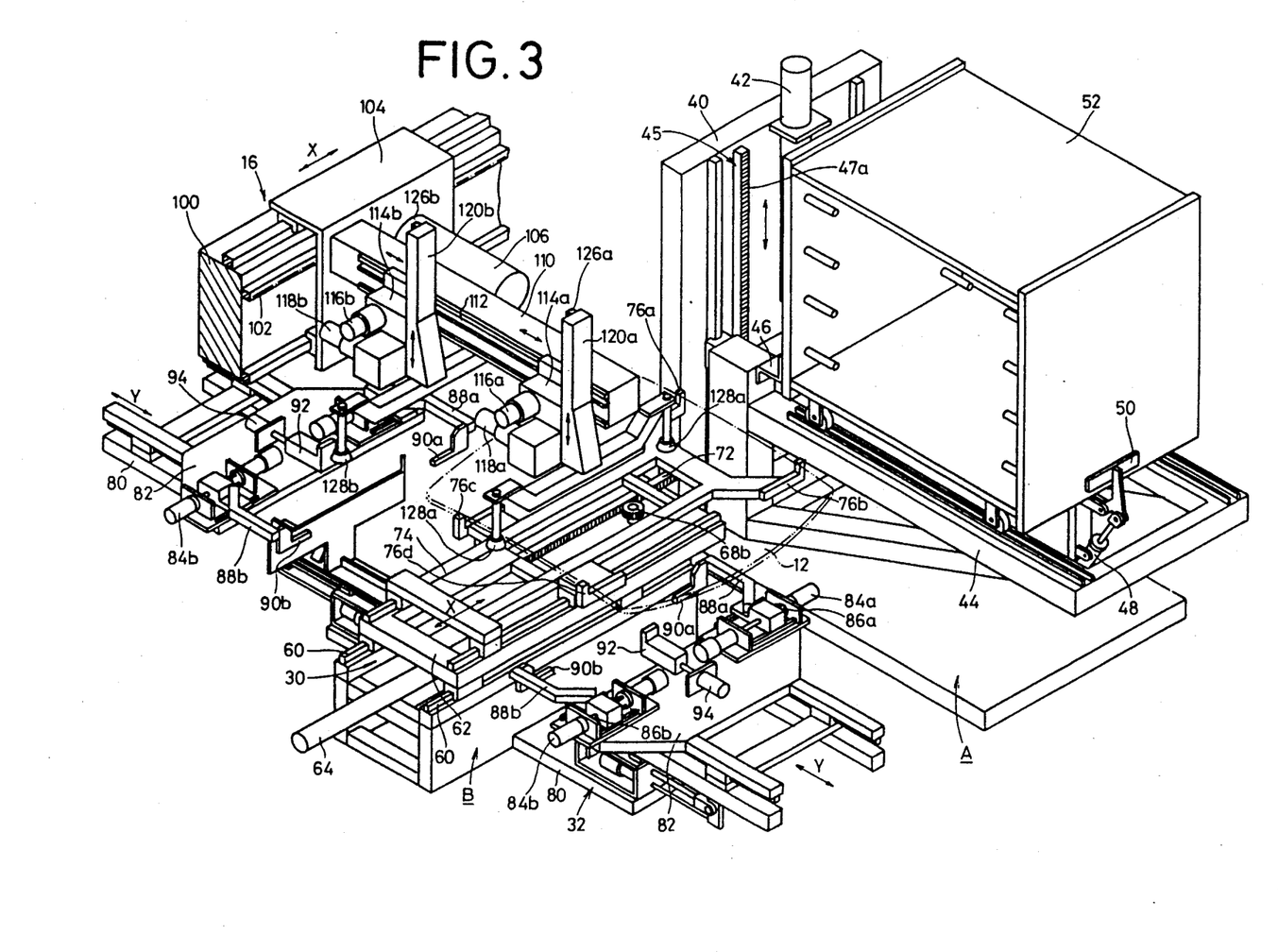
FIG. 3 is a perspective view of the first feed mechanism.
Figure 4:
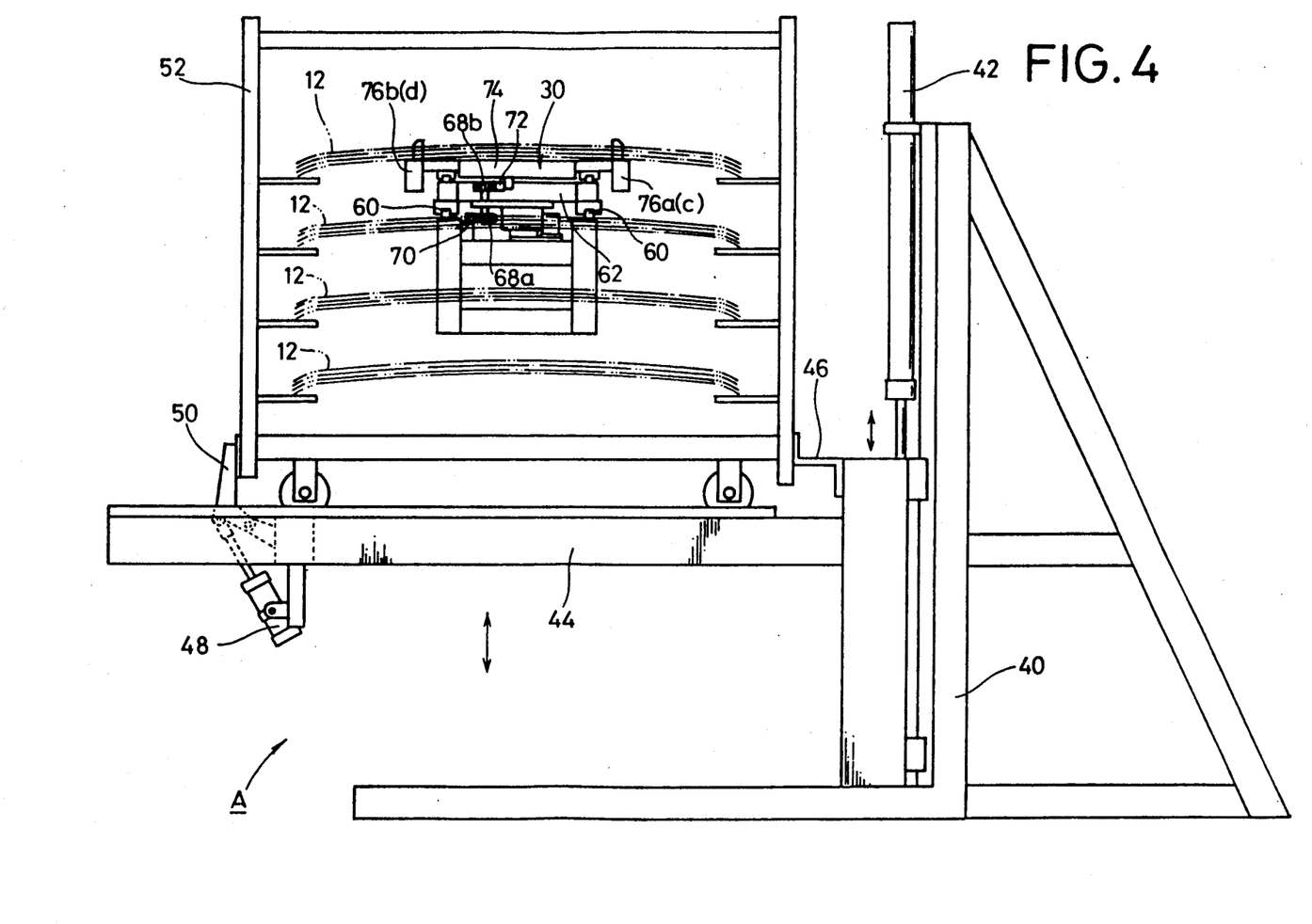
FIG. 4 is a side elevational view of an unloading station.

As shown in FIGS. 2 through 4, the unloading station A has a frame 40 on which a base 44 is vertically movably supported by a cylinder 42. The frame 40 and the base 44 have a position detector 45 which comprises a rack 47a fixed to the frame 40, a pinion 47b rotatably mounted on the base 44 and meshing with the rack 47a, and an encoder 47c mounted on the base 44 for detecting the angular displacement of the pinion 47b, thereby detecting the vertical position of the base 44 with respect to the frame 40. The base 44 may be vertically moved by a servomotor, and the servomotor may be associated with an encoder.

A carriage 52 is mounted on the base 44 for holding stacks of roof panels 12 in a number of respective vertical tiers or positions. The carriage 52 is normally held in position on the base 44 by a stopper 46 and a lock device 50 that is swingable by a cylinder 48.

The unloading mechanism 30 has a pair of rails 60 extending in directions indicated by the arrow X between the unloading station A and the standby station B. The unloading mechanism 30 also has a movable base 62 movably mounted on the rails 60 and coupled to a piston rod 66 extending from a cylinder 64 fixedly mounted in the standby station B.

Coaxial pinions 68a, 68b are rotatably supported on the movable base 62. The pinion 68a is held in mesh with a first rack 70 fixedly mounted in the standby station B. The pinion 68b is held in mesh with a second rack 72 fixed to a support base 74 which is movably mounted on the movable base 62. The support base 74 has a plurality of workpiece clamp fingers 76a through 76d.

The positioning mechanism 32 has a pair of bases 80 spaced apart from each other and positioned one on each side of the rails 60. Slide bases 82 are movably mounted on the bases 80, respectively, and are movable by racks and pinions (not shown) in directions indicated by the arrows Y perpendicularly to the directions X.

Each slide base 82 supports a pair of confronting cylinders 84a, 84b fixed thereto and having respective piston rods 86a, 86b to which respective aligning jigs 88a, 88b are attached. The aligning jigs 88a, 88b are of a bent shape and have workpiece rests 90a, 90b on their distal ends.

Figure 5:
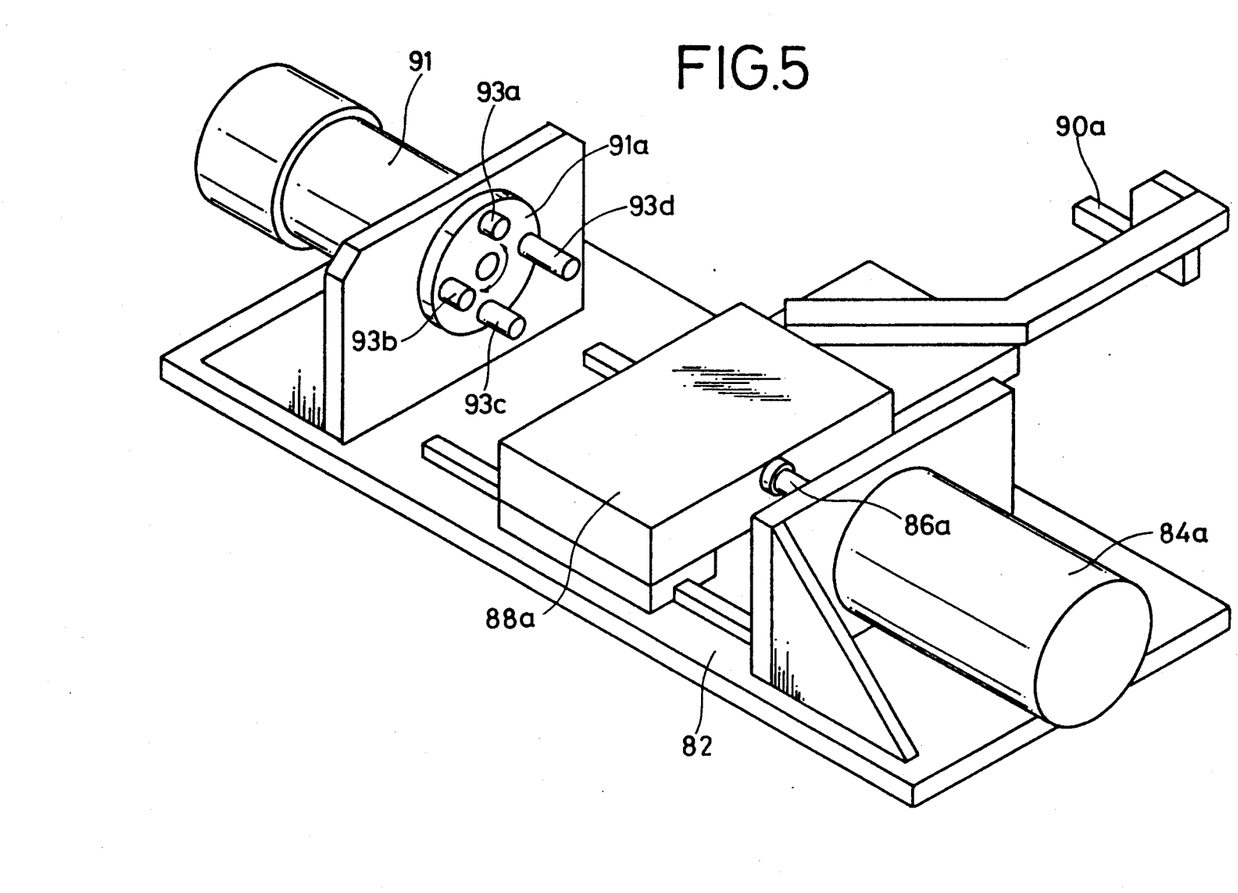
FIG. 5 is a perspective view of an aligning jig and an index unit.

Each slide base 82 also supports a pair of index units including respective cylinders 91 positioned in facing relation to the respective cylinders 84a, 84b. Each of the cylinders 91 has a rotatable shaft to which there is fixed a rotary disc 91a that has a plurality of angularly spaced positioning pins 93a through 93d of different lengths, as shown in FIG. 5. The positioning pins 93a through 93d are used to engage the aligning jigs 88a, 88b to position a roof panel supported on the workpiece rests 90a, 90b. The number of positioning jigs may be increased or reduced as desired.

A work presser 92 is disposed on each of the slide bases 82 between the aligning jigs 88a, 88b, and movable back and forth in the directions Y by a cylinder 94.

The first feed mechanism 16 has a rail 100 extending in the direction X between the standby station B and the working station 14, with a rack 102 fixed to the rail 100. A mobile body 104 is movably mounted on the rail 100 and supports a first servomotor 106 which has a rotatable pinion (not shown) that is held in mesh with the rack 102.

An arm 110 extends from the mobile body 104 in the directions Y, and a rack 112 is horizontally secured to the arm 110. Slide bases 114a, 114b are movably mounted on the arm 110 and support respective second servomotors 116a, 116b whose pinions (not shown) are held in mesh with the rack 112. The slide bases 114a, 114b also support respective pinions (not shown) that are held in mesh with respective racks 126a, 126b which are vertically secured to vertically movable bases 120a, 120b, respectively. Each of the vertically movable bases 120a, 120b supports on its lower end a pair of spaced suction cups 128a, 128b connected to a suction device (not shown).

Figure 6:
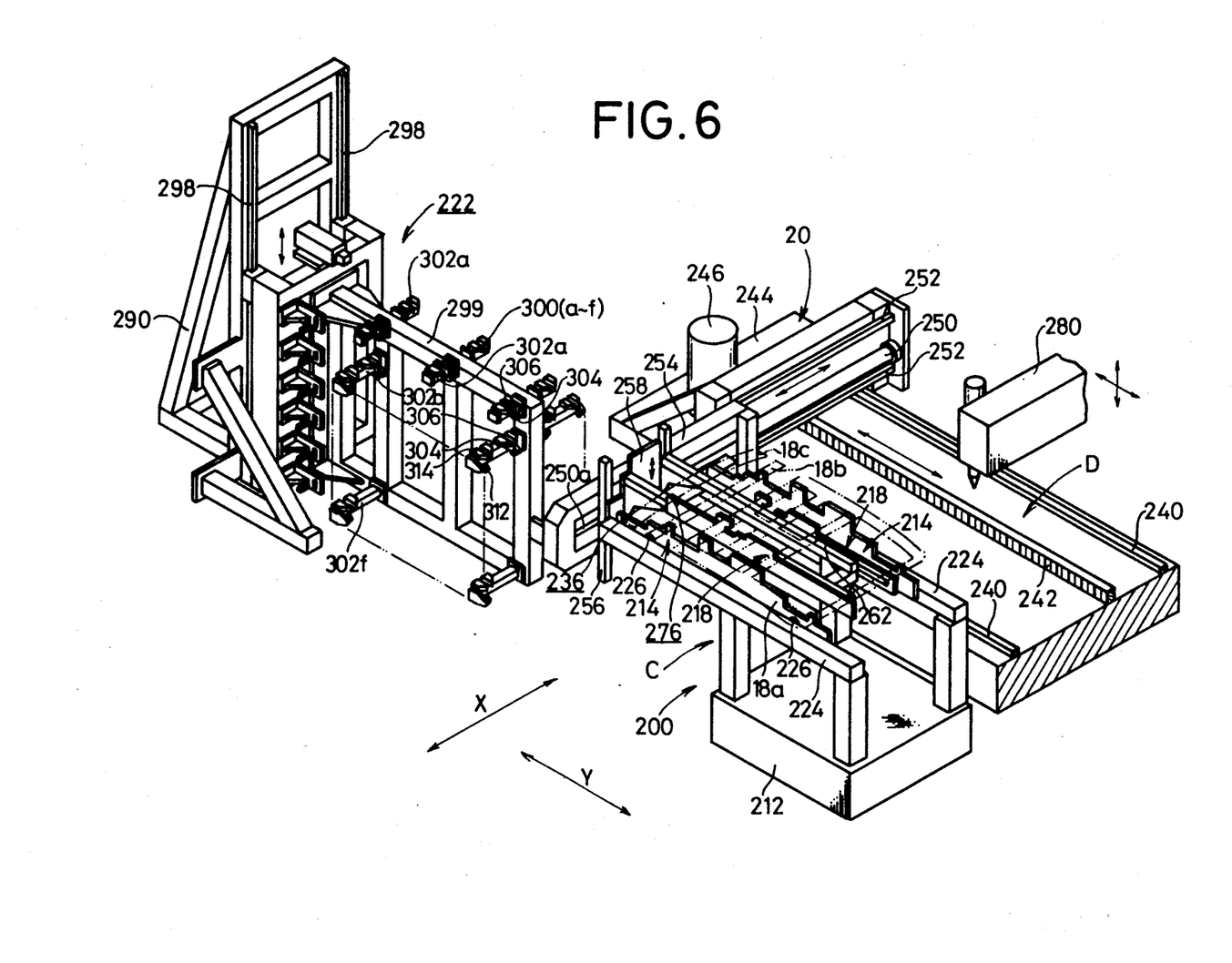
FIG. 6 is a perspective view of a second feed mechanism of the apparatus.
Figure 7:
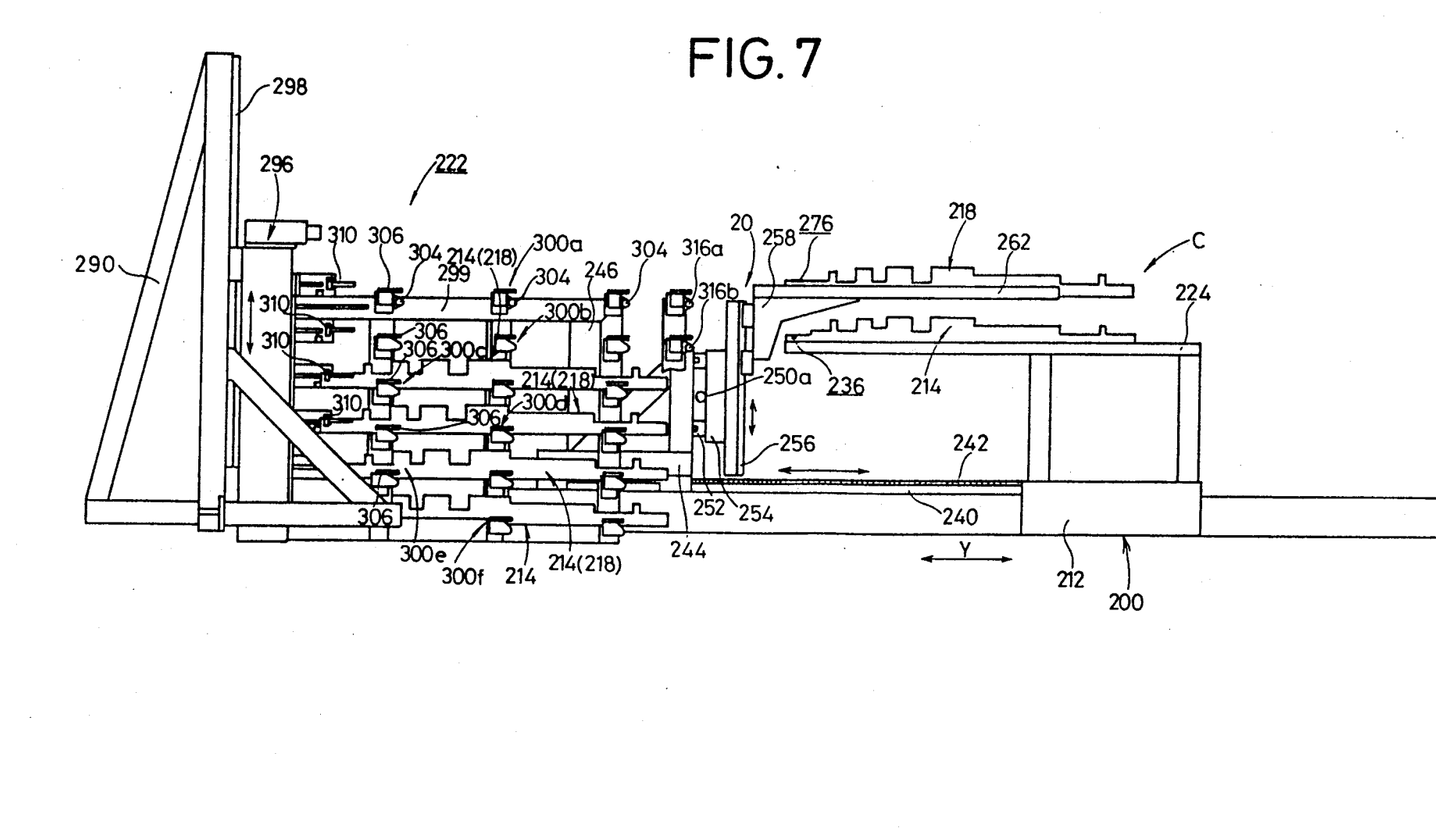
FIG. 7 is a front elevational view of a locating station.

As shown in FIGS. 6 and 7, the stiffeners 18a, 18b, 18c are arranged by an aligning mechanism 200 and delivered thereby to the second feed mechanism 20. The aligning mechanism 200 comprises a pair of parallel first elongate jigs 214 detachably mounted on a fixed base 212 in a locating station C and extending in the directions Y, and a pair of parallel second elongate jigs 218 disposed between the first elongate jigs 214, for holding the workpieces or stiffeners 18a, 18b, 18c as they are positioned on the first elongate jigs 214, and delivering the stiffeners 18a, 18b, 18c to a sealing station D. The second elongate jigs 218 are mounted on the second feed mechanism 20. A stocker 222 is disposed parallel to the second feed mechanism 20 and adjacent to the locating station C.

Figure 8:
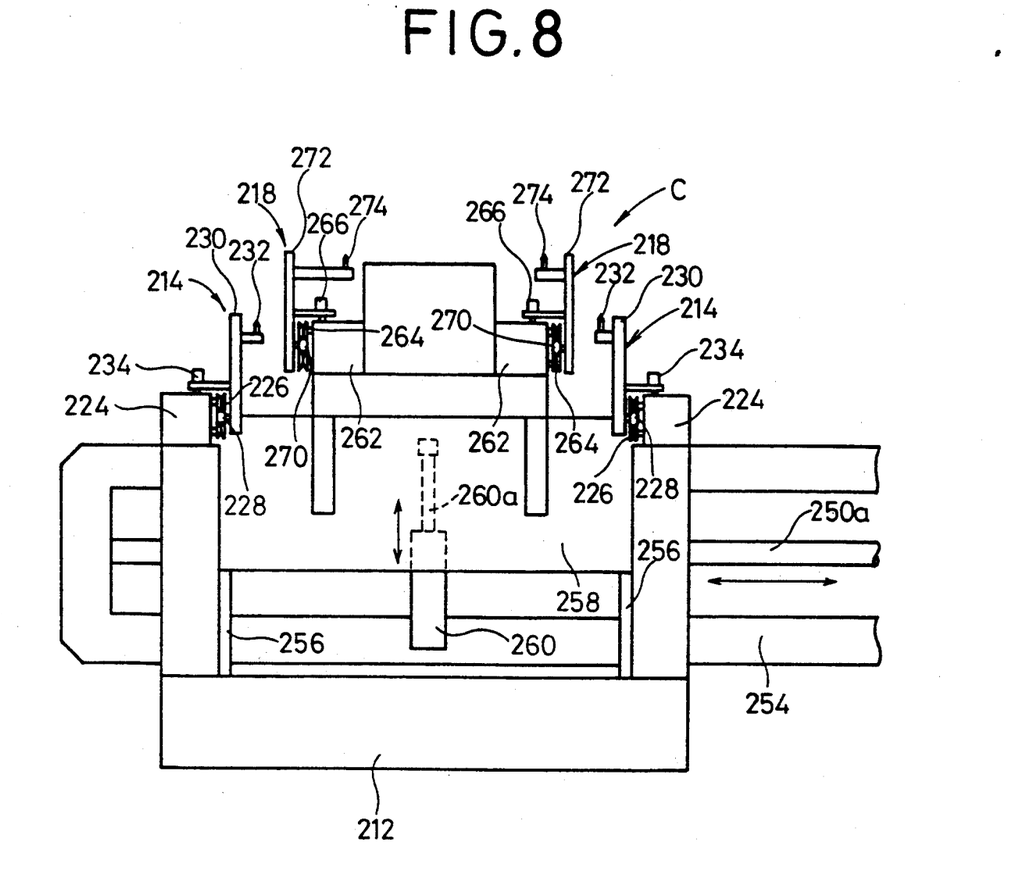
FIG. 8 is a side elevational view of the locating station.

A pair of support bars 224 extending in the directions Y is fixedly mounted on the fixed base 212. As shown in FIG. 8, a plurality of pairs of vertically spaced confronting guide rollers 226 are mounted on the support bars 224 at spaced intervals. The first elongate jigs 214 have respective rails 228 supported between the paired guide rollers 226 on the support bars 224, and have locking members 230 and positioning pins 232 for holding and positioning the stiffeners 18a, 18b, 18c. The first elongate jigs 214 have one ends securely fixed to the support bars 224, respectively, by detachable lock pins 234, and have engaging grooves 236 defined in the other ends thereof.

As shown in FIGS. 6 and 7, the second feed mechanism 20 has a pair of rails 240 extending in the directions Y, a rack 242 extending parallel to and between the rails 240, and a movable base 244 movably supported on the rails 240. The movable base 244 supports thereon a motor 246 which has a rotatable pinion (not shown) that is held in mesh with the rack 242. A cylinder 250 and a pair of rails 252, one on each side of the cylinder 250 are supported on the movable base 244, the cylinder 250 and the rails 252 extending in the direction X. The rails 252 support a movable frame 254 to which there is fixed a piston rod 250 extending from the cylinder 250. The movable frame 254 supports a pair of vertical rails 256 on which a vertically movable base 258 is supported. A cylinder 260 fixed to the movable frame 254 and has an upwardly extending piston rod 260a (FIG. 8) fixed to the vertically movable base 258.

The vertically movable base 258 has a pair of support bars 262 disposed between and extending parallel to the support bars 224. The support bars 262 have a plurality of pairs of vertically spaced confronting guide rollers 264 at spaced intervals. The second elongate jigs 218 are mounted on the respective support bars 262 by detachable lock pins 266 at first ends of the second elongate jigs 218. The second elongate jigs 218 have respective rails 270 supported between the paired guide rollers 264 on the support bars 262, and have locking members 272 and positioning pins 274 for holding and positioning the stiffeners 18a, 18b, 18c. The second elongate jigs 218 have engaging grooves 276 defined in the other ends thereof.

The sealing station D has a sealing device 280 (FIG. 6) for sealing the stiffeners 18a, 18b, 18c, the sealing device 280 being horizontally movable in the directions X, Y and vertically movable.

Figure 9:
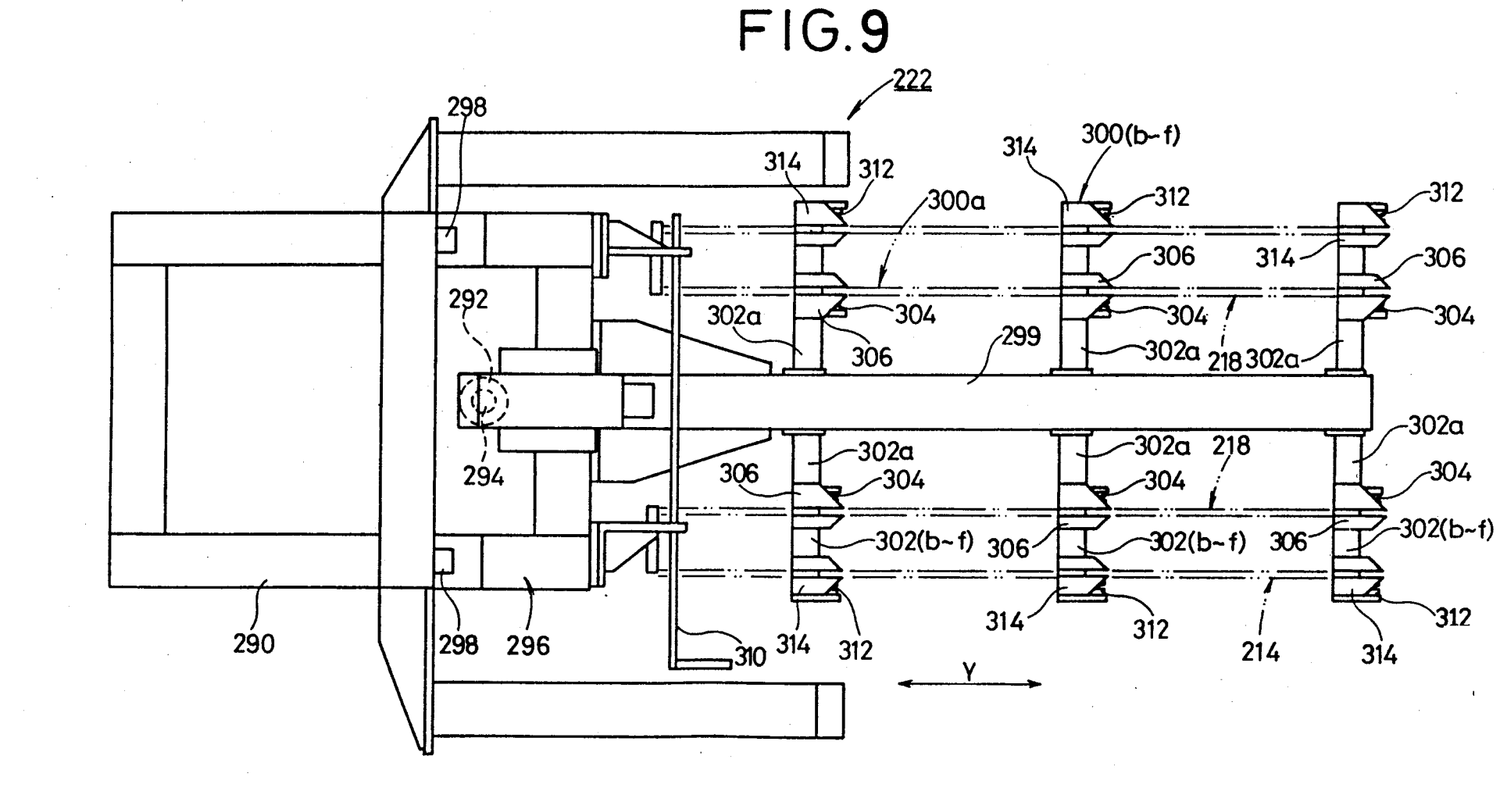
FIG. 9 is an enlarged plan view of a stocker.

As shown in FIG. 9, the stocker 222 has a base 290 with a cylinder 292 mounted thereon. The cylinder 292 has a vertically extending piston rod 294 to which a vertically movable base 296 is fixed. The vertically movable base 296 is vertically movable along a pair of guide rails 298 fixed vertically to the base 290. A frame 299 supported on the vertically movable base 296 has a vertically array of first through sixth storage bins or regions 300a through 300f for storing first and second elongate jigs therein.

The first storage region 300a has a plurality of spaced pairs of support arms 302a disposed in an upper portion of the frame 299 and extending in the directions X. The support arms 302a have guide rollers 304 for engaging the rails 270 on the second elongate jigs 218, and support plates 306 for engaging the opposite sides of the second elongate jigs 218. The frame 299 also has an engaging pate 310 in the first storage region 300a for engaging in the engaging grooves 236 of the second elongate jigs 218 to hold the second elongate jigs 218 in position.

The second storage region 300b, which is positioned beneath the first storage region 300a, has support arms 302b substantially identical to the support arms 302a. The support arms 302b have guide rollers 304 and support plates 306, which are identical to those on the support arms 302a, and also have guide rollers 312 and support plates 314 for engaging the first elongate jigs 214. The frame 299 also has an engaging plate 310 in the second storage region 300b. The first and second elongate jigs 214, 218 can be placed on the support arms 302b in the second storage region 300b, and held in position by the engaging plate 310.

The third through fifth storage regions 300c through 300e also have respective support arms 302c through 302e which are of the same construction as the support arms 302b. Those parts of the support arms 302c through 302e which are identical to those of the support arms 302b are denoted by identical reference characters, and will not be described in detail.

The sixth storage region 300f, which is the lowest storage region, has support arms 302f which have guide rollers 312 and support plates 312 for supporting the first elongate jigs 214. However, the sixth storage region 300f has no guide rollers and support plates for supporting the second elongate jigs 218.

As shown in FIG. 7, auxiliary rollers 316a, 316b are disposed between the frame 299 and the locating station C at vertical positions where the first and second elongate jigs 214, 218 are to be replaced with other first and second elongate jigs 214, 218 stored in the stocker 222.

Figure 10:
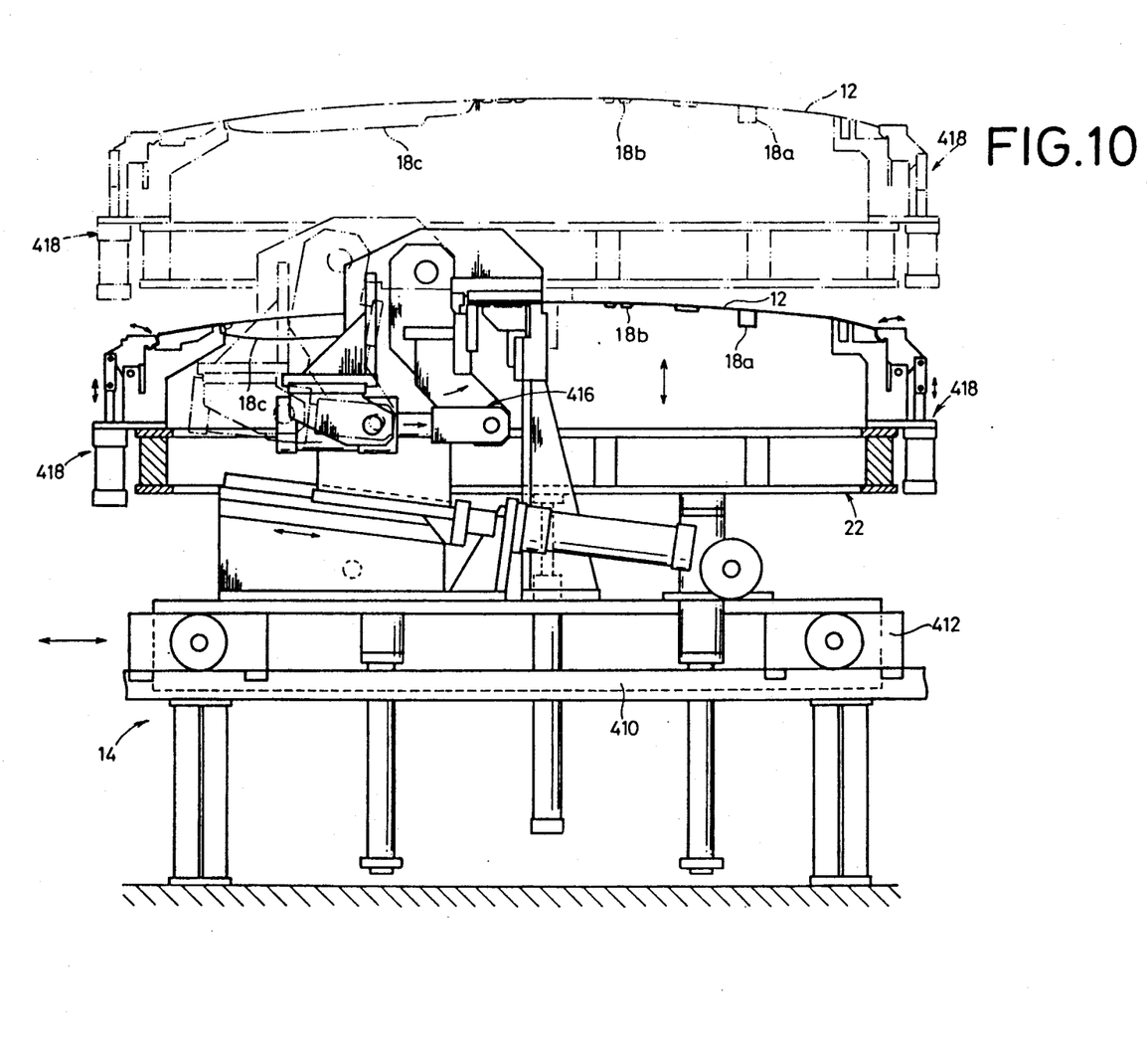
FIG. 10 is a front elevational view of a third feed mechanism and a jig of the apparatus.

The third feed mechanism 24 has a mobile base 412 movable into the working station 14 and a jig exchanging station E along rails 410 by a cylinder 408. The mobile base 412 supports the vertically movable positioning jig 22, and a hemming means 416 (FIG. 10) which is horizontally movable back and forth. The jig 22 has a plurality of clamps 418 for positioning a roof panel 12 and stiffeners 18a through 18c.

The jig exchanging station E has a plurality of mobile bases 412 (FIG. 1) each of a shape corresponding to the shape of a roof unit. Each of the mobile bases 412 is equipped with a jig 22 and a hemming means 416.

The fourth feed mechanism 26 has a movable base 420 movable back and forth in the directions X by an actuator (not shown). The movable base 420 has a plurality of suction cups 422 for holding a roof unit. The fourth feed mechanism 26 feeds a roof unit, held by the suction cups 422, to a welding station F and a discharge station G.

The apparatus for manufacturing a roof unit according to the present invention is constructed as described above. Operation of the apparatus will now be described below.

A roof panel 12 is fed to the working station 14 as follows: In the unloading station A, the carriage 52 is placed on the base 44, and the cylinder 48 is actuated to turn the lock device 50 into locking engagement with the carriage 52, which is locked in place between the lock device 50 and the stopper 46. Stacks of roof panels 12 are stored in tiers in the carriage 52. The cylinder 42 is actuated to move the base 44 vertically until the carriage 52 is vertically held in position. Thereafter, the cylinder 64 of the unloading mechanism 30 is actuated to move the movable base 62 toward the unloading station A. At this time, the first rack 70, the pinions 68a, 68b, and the second rack 72 cause the support base 74 to project from the movable base 62 into a position below the stack of roof panels 12 in the lowermost tier in the carriage 52 in the unloading station A. In the case where the pinions 68a, 68b have the same number of teeth, the support base 74 moves into the carriage 52 at a speed which is twice the speed of the movable base 62. Since the support base 74 as it is retracted is superposed on the movable base 62, the unloading mechanism 30 is of a reduced length when the support base 74 is retracted.

Figure 11A:
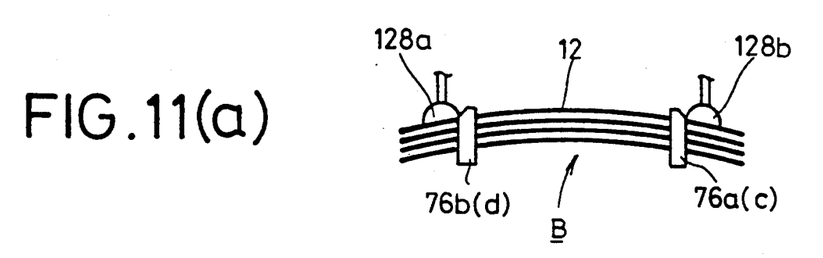
FIGS. 11(a) through 11(c) are views illustrative of the manner in which a roof panel is positioned in a standby station.

Then, the base 44 is lowered by the cylinder 42 to allow the stack of roof panels 12 in the lowest tier to be placed on the workpiece holding fingers 76a through 76d. Thereafter, the cylinder 64 is actuated to move the movable base 62 and the support base 72 toward the standby station B (see FIG. 11(a)).

After the mobile body 104 of the first feed mechanism 16 has moved into the standby station B by the first servomotor 106, the third servomotors 118a, 118b are actuated to lower the vertically movable bases 120a, 120b until the suction cups 128a, 128b are held against the uppermost roof panel 12 of the stack on the workpiece holding fingers 76a through 76d. The non-illustrated suction device is activated to develop a vacuum which enables the suction cups 128a, 128b to attract the uppermost roof panel 12. Then, the third servomotors 118a, 118b are energized in the reverse direction to elevate the vertically movable bases 120a, 120b to a given vertical position.

Figure 11B:
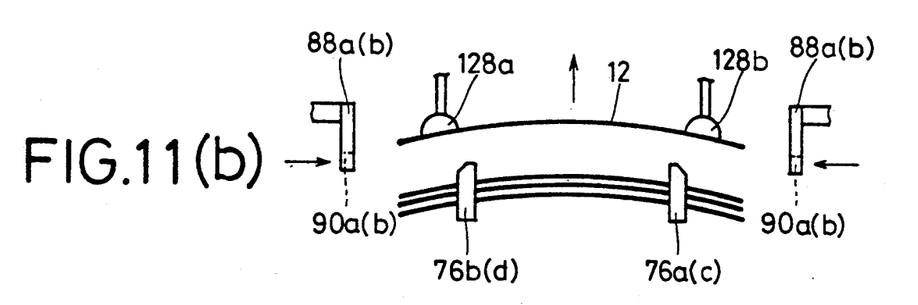

The slide bases 82 of the positioning mechanism 32 are moved toward the rails 60 by the non-illustrated rack and pinions, thereby positioning the workpiece rests 90a, 90b of the aligning jigs 88a, 88b below the roof panel 12 which is being attracted by the suction cups 128a, 128b (see FIG. 11(b)).

Figure 11C:
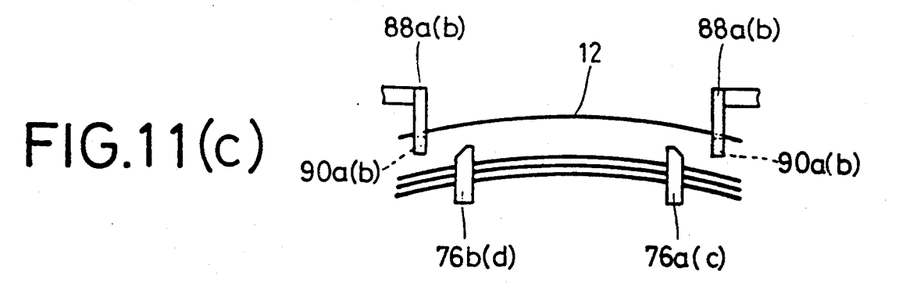

The third servomotors 118a, 118b are actuated again to lower the vertically movable bases 120a, 120b and hence the suction cups 128a, 128b. The roof panel 12 held by the suction cups 128a, 128b is now placed on the workpiece rests 90a, 90b. The suction device is inactivated to permit the suction cups 128a, 128b to release the roof panel 12 (see FIG. 11(c)).

Then, the cylinders 84a, 84b are actuated to displace the aligning jigs 88a, 88b into abutment against certain positioning pins, e.g., the positioning pins 93c, whereupon the roof panel 12 is positioned in a desired posture. At the same time, the cylinders 94 are actuated to bring the workpiece pressers 92 into engagement with opposite edges of the roof pane 12 to position the roof panel 12.

After the roof panel 32 has been positioned by the positioning mechanism 32, the first feed mechanism 16 is actuated to cause the suction cups 128a, 128b to attract and hod the positioned roof panel 12. The first servomotor 106 is energized to move the mobile body 104 together with the roof panel 12 into the working station 14.

If necessary, the slide bases 114a, 114b are positionally adjusted in the directions Y by the second servomotors 116a, 116b, respectively, depending on the dimensions of the roof panel 12.

The second and third servomotors 116a, 116b, 118a 118b are independently actuatable according to a desired teaching process. Therefore, in the working station 14, for example, the roof panel 12 may be inclined by the third servomotors 118a, 118b for attachment to another workpiece or a jig.

In this embodiment, as described above, after the stack of roof panels 12 is unloaded from the unloading station A and delivered into the standby station B, the uppermost roof panel 12 is automatically positioned in the standby station B, and then delivered into the working station 14. Therefore, it is not necessary to position the roof panels accurately in the carriage 52. Even if the roof panels 12 are of a curved or complex configuration, they can automatically be positioned in a desired posture in the standby station B and delivered into the working station 14. Accordingly, the roof panels 12, which have heretofore been supplied to the working, station 14 manually by the operator, are automatically and efficiently supplied to the working station 14.

Since each roof panel 12 is positioned by the positioning mechanism 32 in the standby station B, it is not necessary to employ a dedicated station for positioning roof panels, and hence the space available for the apparatus is effectively utilized or may be relatively small.

In the aligning mechanism 200, the second elongate jigs 218 have been lowered to a position below the first elongate jigs 214 by the vertically movable base 258. A plurality of stiffeners 18a, 18b, 18c are aligned on the first elongate jigs 214. The stiffeners 18a, 18b, 18c are positioned in a certain posture by the locking members 230 and the positioning pins 232 on the first elongate jigs 214.

Then, the cylinder 260 is actuated to push the piston rod 260a upwardly to elevate the vertically movable base 258 along the rails 256, thereby lifting the second elongate jigs 218. On the ascending movement, the second elongate jigs 218 receive the stiffeners 18a, 18b, 18c from the first elongate jigs 214, and hold the received stiffeners 18a, 18b, 18c in a desired posture with the aid of the locking members 272 and the positioning pins 274. Thereafter, the cylinder 260 is inactivated.

The cylinder 250 is actuated to move the vertically movable base 258 in unison with the frame 254 in a direction indicated by the arrow X from the locating station C to the sealing station D In the sealing station D, the stiffeners 18a, 18b, 18c are coated with a sealer by the sealing device 280.

After the stiffeners 18a, 18b, 18c have been sealed, the motor 246 of the second feed mechanism 20 is energized to move the movable base 244 in a direction indicated by the arrow Y along the rails 240. The stiffeners 18a, 18b, 18c positioned and held by the second elongate jigs 218 are transferred onto the jig 22 which is disposed in the working station 14.

In the working station 14, the roof panel 12 and the stiffeners 18a, 18b, 18c are held in position by the clamps 418. If the roof panel 12 has an opening serving as a window for introducing exterior light into an automobile passenger compartment, then the jig 22 is lowered and thereafter the roof panel 12 and the stiffeners 18a, 18b, 18c are hemmed by the hemming means 416.

The jig 22 is moved to a welding position in which the roof panel 12 and the stiffeners 18a, 18b, 18c are welded at suitable spots, thereby producing a roof unit.

The welded roof unit is then fed into the welding station F by the fourth feed mechanism 26. After the roof unit has been welded as required in the welding station F, the roof unit is delivered into the discharge station G.

When different types of roof units are to be manufactured, the jigs are exchanged as follows:

In the locating station C, the cylinder 260 is actuated to displace the vertically movable base 258 up to its upper stroke limit (see FIG. 7). Then, the cylinder 292 of the stocker 222 is actuated to vertically move the base 296 until the first storage region 300a is positioned in vertical alignment with the second elongate jigs 218 in the locating station C. At the same time, the second storage region 302b is positioned in vertical alignment with the first elongate jigs 214 on the fixed base 212.

The lock pins 266, by which the second elongate jigs 218 have been fixed to the vertically movable base 258, are detached, and the second elongate jigs 218 are drawn into the first storage region 300a by the auxiliary rollers 316a and the guide rollers 304. The engaging plate 310 engages in the engaging grooves 276 of the second elongate jigs 218, which are then fixedly positioned in the first storage region 300a.

The lock pins 234, by which the first elongate jigs 214 have been fixed to the fixed base 212, are detached, and the first elongate jigs 214 are drawn into the first storage region 300b by the auxiliary rollers 316b and the guide rollers 312. The engaging plate 310 engages in the engaging grooves 236 of the first elongate jigs 214, which are then fixedly positioned in the second storage region 300b.

The cylinder 292 is actuated to vertically displace the vertically movable base 296 until desired first and second elongate jigs 214, 218 are positioned in vertical alignment with the fixed base 212 and the vertically movable base 258, respectively. The engaging plates 310 are removed out of the engaging grooves of the desired first and second elongate jigs 214, 218. The desired first elongate jigs 214 are moved along and supported on the support bars 224 by the rails 228 and the guide rollers 266, and then fixed in position by the lock pins 234. Likewise, the desired second elongate jigs 218 are moved along and supported on the support bars 262 by the rails 270 and the guide rollers 264, and then fixed in position by the lock pins 234. The first and second elongate jigs 214, 218 are thus replaced with other first and second elongate jigs 214, 218.

The jig 22 in the working station 14 is delivered together with the mobile base 412 into the jig exchanging station E by the cylinder 408 of the third feed mechanism 24. Another mobile base 412 with a desired jig 22 mounted thereon, which has been positioned in the jig exchanging station E, is then fed to the working station 14 by the third feed mechanism 24. In this manner, the jig 22 is therefore replaced with another jig 22.

In the illustrated embodiment, the first elongate jigs 214 are provided for positioning and holding the stiffeners 18a, 18b, 18c, and the second elongate jigs 218 are provided for transferring the positioned stiffeners 18a, 18b, 18c from the locating station C to the sealing station D and the working station 14. Therefore, any large jigs, which have heretofore been required to position relatively large workpieces such as the stiffeners 18a, 18b, 18c, are not required to position the stiffeners 18a, 18b, 18c.

The first and second elongate jigs 214, 218 are relatively small in size and light in weight. Therefore, even when different types of roof units are to be manufactured, the stocker 222 for storing a plurality of such first and second elongate jigs 214, 218 is not substantially increased in size. Since the first and second elongate jigs 214, 218 are lightweight, they can be handled highly efficiently with ease.

Thus, the first and second elongate jigs 214, 218 in plural sets can be stored in a relatively small storage space, and can be dealt with with efficiency.

The first and second elongate jigs 214, 218 are disposed parallel to each other in the illustrated embodiment. However, the first and second elongate jigs 214, 218 may be inclined relatively to each other depending on the shape of stiffeners 18a, 18b, 18c.

The roof panel 12 supplied from the carriage 52 is positioned in the standby station B by the first feed mechanism 16 and then delivered into the working station 14 in the same posture. The roof panel 12 is not required to be inverted or turned upside down, as with the conventional sealing process in which the roof panel 12 has been inverted. The roof panel 12 can thus be delivered into the working station 14 efficiently and easily.

The stiffeners 18a, 18b, 18c are delivered into the sealing station D, sealed therein, and thereafter fed into the working station 14. In the working station 14, the roof panel 12 and the stiffeners 18a, 18b, 18c are hemmed and welded into the roof unit. Thereafter, the roof unit is delivered into the discharge station G.

As described above, various manual operations which have heretofore been carried out by the operator are eliminated or automatized, so that a roof unit can efficiently be manufactured.

The first, second, third, and fourth feed mechanisms 16, 20, 24, 26 are disposed around the working station 14 and oriented in four respective different directions therearound. Simplified steps or processes of processing the roof unit 12 and the stiffeners 18a, 18b, 18c are effective to reduce the number of dedicated jigs used in the manufacture of roof units. As a result, the space available for manufacturing the roof units can effectively be utilized.

The method of and apparatus for manufacturing a roof unit according to the present invention offer the following advantages:

Stacked roof panels are unloaded one by one and delivered to the working station, and stiffeners for the roof panels are sealed and fed to the working station. The roof panel and the stiffeners are then assembled into a roof unit in the working station. The roof panel and the stiffeners are processed efficiently, and assembled into the roof unit easily in a short period of time.

The first, second, third, and fourth feed mechanisms are disposed around the working station and oriented in respective different four directions therearound. The number of dedicated jigs used in the manufacture of roof units is reduced. As a result, the space available for manufacturing the roof units can effectively be utilized.

A stack of workpieces, i.e., stiffeners, is unloaded from the unloading station, and the uppermost one of the unloaded workpieces is positioned in a desired posture in the standby station and then fed to the next process. Any dedicated station for positioning workpieces is therefore not required, resulting in effective utilization of the space available for the manufacture of roof units.

After a stack of workpieces is unloaded from the unloading station and fed to the standby station, the workpieces are successively positioned in a desired posture by the positioning mechanism and delivered to the next station, all automatically. Accordingly, the stacked workpieces can automatically and efficiently be fed in a desired posture, so that the workpieces can be efficiently supplied to the desired stations.

Since workpieces such as stiffeners are positioned and held by at least one pair of elongate jigs, the elongate jigs may be relatively small in size and light in weight even if the workpieces are relatively large in size. In the case where a plurality of elongate jigs are employed, the stocker for storing such elongate jigs may be relatively small in size, and the elongate jigs can be handled with ease.

Although a certain preferred embodiment has been shown and described, it should be understood that many changes and modifications may be made therein without departing from the scope of the appended claims.

What is claimed is:

1. A method of manufacturing a roof unit for an automobile, wherein the assembled roof unit is maintained in a predetermined orientation which is the same orientation as the orientation of the roof unit shall be when assembled onto an automobile body, comprising the steps of:
   setting at least one stiffener on a jig in a position for receiving a roof panel thereon;
   feeding said at least one stiffener on said jig to a sealing station;
   coating said at least one stiffener with an sealant in said sealing station;
   feeding the coated stiffener to a working station;
   unloading a stack of roof panels from an unloading station, and feeding the stack of roof panels from an unloading station, and feeding the stack of roof panels to a standby station;
   holding and elevating an uppermost one of the roof panels in said standby station, positioning the elevated roof panel in a desired position, and releasing said roof panel at said desired position;
   feeding the positioned roof panel to said working station, while maintaining said roof panel in said predetermined orientation;
   assembling said roof panel and said at least one stiffener into a roof unit in said working station; and
   feeding said assembled roof unit from said working station while maintaining the assembled roof unit in the same orientation in which the roof unit shall be assembled onto said automobile body.

2. The method according to claim 1, wherein the roof panels include those with sun roof openings and those with no openings, both of which are provided along the same manufacturing line wherein said roof panels with the sun roof openings require the further step of hemming the periphery of said opening with a stiffener at said working station.

* * * * *